United States Patent
Kataoka et al.

(10) Patent No.: US 10,479,358 B2
(45) Date of Patent: Nov. 19, 2019

(54) IN-LANE DRIVING ASSIST APPARATUS FOR A VEHICLE

(71) Applicant: TOYOTA JIDOSHA KABUSHIKI KAISHA, Toyota-shi, Aichi (JP)

(72) Inventors: Hiroaki Kataoka, Toyota (JP); Kazuma Hashimoto, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 15/812,212

(22) Filed: Nov. 14, 2017

(65) Prior Publication Data

US 2018/0134290 A1    May 17, 2018

(30) Foreign Application Priority Data

Nov. 17, 2016  (JP) .................................. 2016-224314

(51) Int. Cl.
    *B60W 30/12*    (2006.01)
    *B62D 15/02*    (2006.01)

(52) U.S. Cl.
    CPC .......... *B60W 30/12* (2013.01); *B62D 15/025* (2013.01)

(58) Field of Classification Search
    CPC .............................. B60W 30/12; B62D 15/025
    See application file for complete search history.

(56) References Cited

U.S. PATENT DOCUMENTS

| | | | |
|---|---|---|---|
| 6,185,492 B1 | 2/2001 | Kagawa et al. | |
| 2012/0226392 A1* | 9/2012 | Kataoka | G08G 1/167 701/1 |
| 2015/0183426 A1* | 7/2015 | Oyama | B60W 30/00 701/1 |
| 2015/0246687 A1* | 9/2015 | Takeda | B62D 6/002 701/41 |
| 2016/0272202 A1* | 9/2016 | Inomata | B62D 5/0481 |
| 2017/0225711 A1* | 8/2017 | DeCia | B60W 10/20 |
| 2019/0071079 A1* | 3/2019 | Nishiguchi | B60R 21/01538 |

FOREIGN PATENT DOCUMENTS

| | | |
|---|---|---|
| JP | H11-105728 A | 4/1999 |
| JP | 2004-26031 A | 1/2004 |
| JP | 2015-115040 A | 6/2015 |
| WO | 2011/064825 A1 | 6/2011 |

* cited by examiner

*Primary Examiner* — Thomas Ingram
(74) *Attorney, Agent, or Firm* — Oliff PLC

(57) ABSTRACT

When switching from lane departure suppression control (LDA control) to lane keep assist control (LKA control), a self-vehicle is suppressed from deviating out of a traveling lane. A driving assist preferentially carries out the LKA control, but carries out the LDA control instead of the LKA control when there is a possibility that the self-vehicle may deviate out of the traveling lane under the LKA control. When the LDA control is returned to the LKA control after the lane departure avoidance operation of the self-vehicle is completed, the LDA control is continued while an angle between an orientation of the self-vehicle and the traveling lane is not a predetermined angle or less, and it is switched to the LKA control after the angle becomes the predetermined angle or less.

4 Claims, 10 Drawing Sheets

IN-LANE DRIVING ASSIST APPARATUS FOR A VEHICLE

TECHNICAL FIELD

The present invention relates to an in-lane driving assist apparatus for a vehicle, which assists an operation by a driver such that the vehicle runs within a lane.

BACKGROUND ART

Conventionally, as proposed by the Patent Document 1 (PTL1), a driving assist apparatus for a vehicle, which carries out lane keep assist control and lane departure suppression control has been known. For example, the lane keep assist control assists a steering operation by a driver, by detecting white lines on right and left sides of a road with a camera sensor, setting up a target traveling line (for example, a central line which is in a center position of the right and left white lines) based on these right and left white lines, and giving steering assist torque to a steering mechanism such that a traveling position of a self-vehicle is maintained near the target traveling line.

On the other hand, the lane departure suppression control is control in which steering assist torque is given to a steering mechanism to assist a steering operation by a driver such that a self-vehicle does not deviate out of a traveling lane when the self-vehicle is likely to deviate out of the traveling lane (out of the white line). Although an apparatus disclosed in the Patent Document 1 (PTL1) informs a driver of a warning when a self-vehicle deviates out of a traveling lane, the one which gives a warning to a driver and offers steering operation assistance by giving steering assist torque, as mentioned above, has been known for these days.

An in-lane driving assist apparatus comprises a lane keep assist control part which is a function part to carry out the lane keep assist control and a lane departure suppression control part which is a function part to carry out the lane departure suppression control, and switches between the lane keep assist control and the lane departure suppression control depending on a predetermined switching condition, such as the traveling position of the self-vehicle with respect to the traveling lane, and performs the control.

CITATION LIST

Patent Literature

[PTL1] International Publication No. WO2011/064825

SUMMARY OF INVENTION

Since the lane departure suppression control is intended to prevent an accident, it is configured such that quick steering is possible to prevent a self-vehicle from deviating out of a traveling lane. Therefore, control gain of the steering assist torque in the lane departure suppression control is set to a large value. On the other hand, the lane keep assist control is intended to assist a driving operation by a driver such that a self-vehicle travels along the target traveling line, and it is required that a steering feeling is comfortable. For this reason, the steering assist torque is set such that steering is performed slowly. Therefore, control gain of the steering assist torque for maintaining the traveling position of the self-vehicle near the target traveling line is set to a smaller value as compared with the control gain in the lane departure suppression control.

For this reason, for example, when traveling on a sharp curve, the lane keep assist control cannot make a self-vehicle travel along the target traveling line. In this case, as shown in FIG. 10, since the self-vehicle deviates out of the traveling lane only under the lane keep assist control, the lane departure suppression control is carried out in place of the lane keep assist control, for example, at a stage where the self-vehicle approaches the white line. Therefore, the self-vehicle can be prevented from deviating out of the traveling lane or the amount of departure can be suppressed to a small value. In this way, the control to be carried out is switched from the lane departure suppression control to the lane keep assist control, while the self-vehicle is returned to the center side of the traveling lane.

However, since the control gain is small in the lane keep assist control, an orientation of the self-vehicle cannot be quickly turned to a direction parallel to the traveling lane when it is switched to the lane keep assist control in a situation where the self-vehicle is oriented inside with respect to the traveling lane. As a result, there is a possibility that the self-vehicle may deviate out of the traveling lane (at the road end on the opposite side of the road end at which lane departure is avoided most recently) immediately after resuming the lane keep assist control.

The present invention has been conceived in order to solve the above-mentioned subject, and an object of the present invention is to suppress a self-vehicle from deviating out of a traveling lane when switching from the lane departure suppression control to the lane keep assist control.

In order to attain the above-mentioned objective, a feature of the present invention is in that an in-lane driving assist apparatus for a vehicle, comprising:

a lane keep assist control means (13) to carry out lane keep assist control that is control in which steering assist torque for maintaining traveling position of a self-vehicle near a target traveling line is given to a steering mechanism, and a lane departure suppression control means (12) to carry out lane departure suppression control that is control in which steering assist torque for keeping the self-vehicle from departing out of a traveling lane is given to the above-mentioned steering mechanism, wherein:

the above-mentioned in-lane driving assist apparatus for a vehicle further comprises a control switching means (14) to make the above-mentioned lane departure suppression control means carry out the lane departure suppression control, in place of the above-mentioned lane keep assist control, when there is a possibility that the self-vehicle may depart out of the above-mentioned traveling lane in the above-mentioned lane keep assist control (S16: Yes), while preferentially making the above-mentioned lane keep assist control means carry out the lane keep assist control, and the above-mentioned lane departure suppression control means is configured so as to give the above-mentioned steering mechanism steering assist torque including a torque component (K3·θy) which acts such that the self-vehicle is oriented to a direction parallel to the above-mentioned traveling lane, and the above-mentioned control switching means is configured so as to make the above-mentioned lane keep assist control means continue the above-mentioned lane departure suppression control when an angle (θy) between the direction, to which the self-vehicle is oriented, and the above-mentioned traveling lane is not a predetermined angle (θyref) or less (S19: No, S18), and to make the above-mentioned lane keep assist control means carry out the above-mentioned lane keep assist control (S14) after the above-mentioned angle becomes the above-mentioned predetermined angle or less (S19: Yes).

The in-lane driving assist apparatus for a vehicle according to the present invention is configured such that the lane keep assist control and the lane departure suppression control can be switched to each other and carried out. The lane keep assist control means carries out lane keep assist control that is control in which steering assist torque for maintaining traveling position of a self-vehicle near a target traveling line is given to a steering mechanism. The lane departure suppression control means carries out lane departure suppression control that is control in which steering assist torque for keeping the self-vehicle from departing out of a traveling lane is given to the steering mechanism.

It is required that control gain for determining the steering assist torque in the lane keep assist control is set to a smaller value than control gain for determining the steering assist torque in the lane departure suppression control such that a comfortable steering feeling (slow steering) is obtained. In a case where the control gain of the lane keep assist control is set so as to satisfy such a requirement, since the steering assist torque cannot be increased quickly when traveling on a sharp curve, etc., it becomes impossible to make the self-vehicle follow the target traveling line. For this reason, a possibility that the self-vehicle may deviate outside out of the traveling lane occurs only by the lane keep assist control.

Then, when there is a possibility that the self-vehicle may deviate out of the traveling lane, the control switching means makes the lane departure suppression control means carry out the lane departure suppression control in place of the lane keep assist control, while making the lane keep assist control means preferentially carry out the lane keep assist control. Thereby, when the self-vehicle approaches an end of the traveling lane, the lane departure suppression control is carried out in place of the lane keep assist control. In this way, the self-vehicle is returned to the center side of the traveling lane, the lane departure suppression control is completed, and the lane keep assist control is started.

When the orientation of the self-vehicle is slanting to the traveling lane on switching from the lane departure suppression control to the lane keep assist control, there is a possibility that the self-vehicle may deviate out of the traveling lane (at the road end on the opposite side of the road end at which lane departure is avoided most recently) immediately after resuming the lane keep assist control.

On the other hand, the lane departure suppression control means gives the steering mechanism steering assist torque including a torque component which acts such that the self-vehicle is oriented to a direction parallel to the traveling lane. Therefore, after the self-vehicle avoids lane departure, the self-vehicle is turned in an orientation parallel to the traveling lane. Then, in a case where the control to be carried out is returned to the lane keep assist control from the lane departure suppression control, the control switching means makes the lane departure suppression control means continue the lane departure suppression control during the angle between the orientation of the self-vehicle (the orientation of the vehicle antero-posterior axis) and the traveling lane is not a predetermined angle or less. Then, after the above-mentioned angle becomes the predetermined angle or less, the control switching means makes the lane keep assist control means carry out the lane keep assist control. Thereby, the self-vehicle can be suppressed from deviating out of the traveling lane.

This predetermined angle is an angle at which the self-vehicle can be suppressed from deviating out of the traveling lane. For example, this angle may be an angle at which the orientation of the self-vehicle can be considered to be substantially parallel to the traveling lane.

Another feature of the present invention is in that the above-mentioned lane departure suppression control includes parallel control that is control carried out after the above-mentioned steering assist torque is switched to decrease, in which a function to orient the self-vehicle to the direction parallel to the above-mentioned traveling lane is made stronger than that in the previous lane departure suppression control.

In accordance with this invention, the parallel control is carried out after the steering assist torque is switched to decrease. This parallel control is control in which a function to orient the self-vehicle to the direction parallel to the traveling lane is made stronger in the lane departure suppression control. Thereby, the orientation of the self-vehicle approaches the orientation of the traveling lane at an early stage. Therefore, the lane departure suppression control can be switched to the lane keep assist control smoothly.

Moreover, another feature of the present invention is in that an in-lane driving assist apparatus for a vehicle, comprising:

a lane keep assist control means (13) to carry out lane keep assist control that is control in which steering assist torque for maintaining traveling position of a self-vehicle near a target traveling line is given to a steering mechanism, and a lane departure suppression control means (12) to carry out lane departure suppression control that is control in which steering assist torque for keeping the self-vehicle from departing out of a traveling lane is given to the above-mentioned steering mechanism, wherein:

the above-mentioned in-lane driving assist apparatus for a vehicle further comprises a control switching means (14) to make the above-mentioned lane departure suppression control means carry out the lane departure suppression control, in place of the above-mentioned lane keep assist control, when there is a possibility that the self-vehicle may depart out of the above-mentioned traveling lane in the above-mentioned lane keep assist control (S16: Yes), while preferentially making the above-mentioned lane keep assist control means carry out the lane keep assist control, and the above-mentioned control switching means is configured so as to make the above-mentioned lane keep assist control means carry out stronger lane keep assist control (formula (3)) in which a control gain for determining the steering assist torque in the above-mentioned lane keep assist control is increased and thereafter the above-mentioned lane keep assist control (formula (2)) in which the above-mentioned control gain is brought back to a usual value, when the control to be carried out is returned from the above-mentioned lane departure suppression control to the above-mentioned lane keep assist control.

In the present invention, the control switching means makes the lane keep assist control means carry out the stronger lane keep assist control, in which the control gain for determining the steering assist torque in the lane keep assist control is increased, when the control to be carried out is returned from the lane departure suppression control to the above-mentioned lane keep assist control and, thereafter, the lane keep assist control, in which the control gain is brought back to a usual value (value which is not increased). In the stronger lane keep assist control, convergence performance that is performance to make a self-vehicle converge to a target traveling line is improved. For this reason, the self-vehicle can be oriented to the orientation of the target traveling line (orientation of the traveling lane) during the stronger lane keep assist control is being carried out. Therefore, even when the lane keep assist control, in which the control gain is returned to the usual value, is carried out thereafter, the self-vehicle can be suppressed from deviating out of the traveling lane.

In this case, the above-mentioned control switching means may be configured so as to carry out the above-mentioned lane keep assist control, in which the above-mentioned control gain is brought back to the usual value, in place of the above-mentioned stronger lane keep assist control, when a departure amount in a road width direction of the self-vehicle from the above-mentioned target traveling line is a predetermined value or less and an angle between the direction, to which the self-vehicle is oriented, and the above-mentioned traveling lane is a predetermined angle or less.

In accordance with this, the usual lane keep assist control can be started after behavior of the self-vehicle becomes certainly stable, and the self-vehicle can be suppressed from deviating out of the traveling lane.

Although reference signs used in embodiments are attached to constituent elements of the present invention corresponding to the embodiments in parentheses in the above-mentioned explanation in order to help understanding of the present invention, respective constituent elements of the present invention are not limited to the embodiments specified with the above-mentioned reference signs.

DESCRIPTION OF EMBODIMENTS

Figure 1:
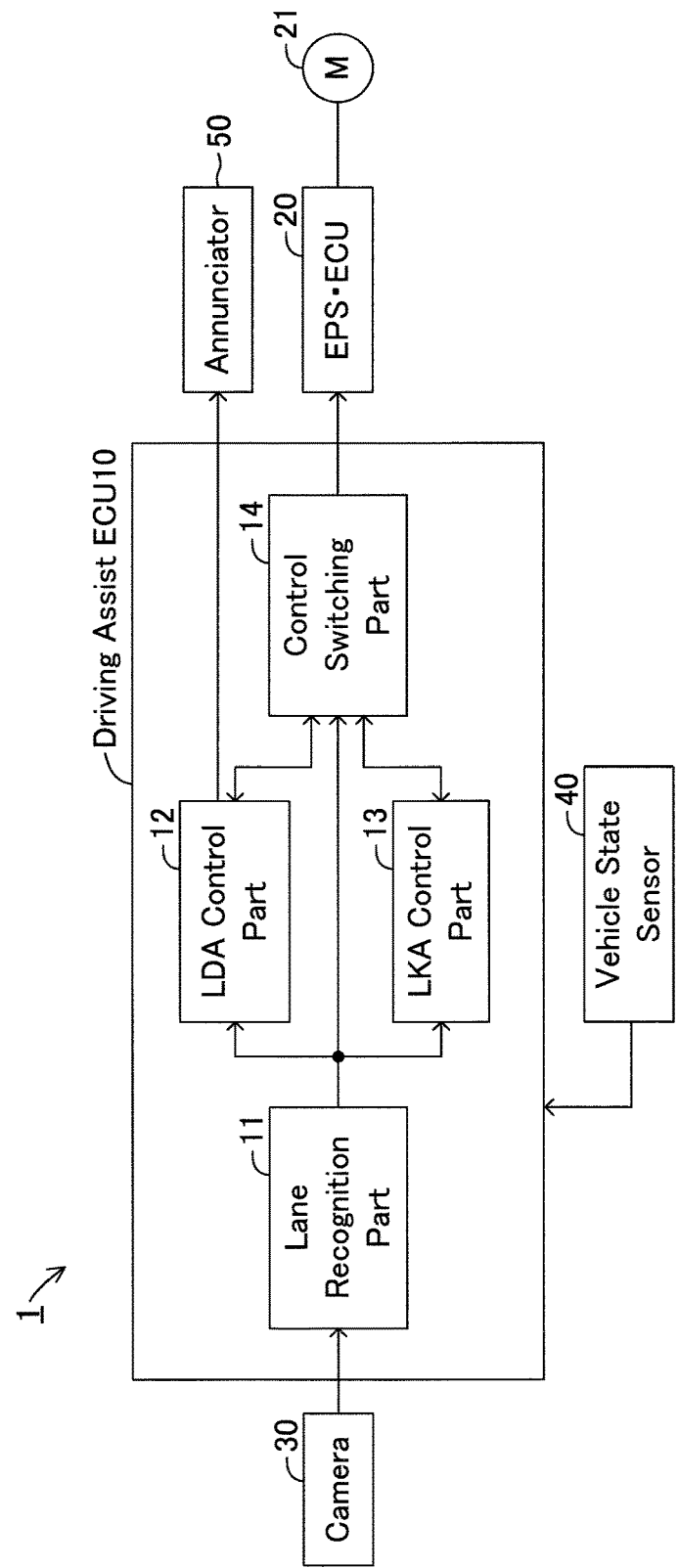
FIG. 1 is a schematic system configuration of an in-lane driving assist apparatus for a vehicle according to the present embodiment.

Hereafter, embodiments of the present invention will be explained in detail using drawings. FIG. 1 is a schematic system configuration of an in-lane driving assist apparatus for a vehicle according to an embodiment.

An in-lane driving assist apparatus 1 for a vehicle comprises a driving assist ECU10, an electric power-steering ECU20, a camera 30, a vehicle state sensor 40, and an annunciator 50. Hereafter, the electric power-steering ECU20 will be referred to as an EPS-ECU (Electric Power Steering ECU) 20. ECU is an abbreviation for Electric Control Unit.

The EPS-ECU20 is a control device of an electric power-steering apparatus, and comprises a microcomputer and a motor drive circuit as principal parts. The EPS-ECU20 assists a steering operation by a driver, by detecting steering torque which the driver inputs into a steering handle (not shown) with a steering torque sensor disposed in a steering shaft and carrying out drive control of an assist motor 21 based on this steering torque to giving steering torque to a steering mechanism. In addition, in the present specification, the microcomputer comprises a CPU and a storage unit, such as an ROM and an RAM, etc., and the CPU is configured to realize various functions by executing instruction (program) stored in the ROM.

The EPS-ECU20 is connected with the driving assist ECU10. When a steering instruction is received from the driving assist ECU10, the EPS-ECU20 drives the assist motor 21 by a controlled variable specified by the steering instruction to generate steering assist torque. Unlike the steering assist torque given in order to attain a light handle operation by a driver, this steering assist torque expresses torque given to the steering mechanism according to the steering instruction from the driving assist ECU10 independently of handle operation force of the driver.

The driving assist ECU10 comprises a microcomputer as a principal part and functions of the microcomputer are divided roughly into a lane recognition part 11, a lane departure suppression control part 12, a lane keep assist control part 13, and a control switching part 14. The driving assist ECU10 calculates a controlled variable (target torque) for instructing the EPS-ECU20 based on a vehicle state quantity detected by the vehicle state sensor 40.

The vehicle state sensor 40 is a group of sensors necessary for calculating the target torque, such as a vehicle speed sensor to detect vehicle speed of a self-vehicle, a yaw rate sensor to detect a yaw rate of the self-vehicle, and a lateral acceleration sensor to detect acceleration in a transverse direction of the self-vehicle.

Figure 2:
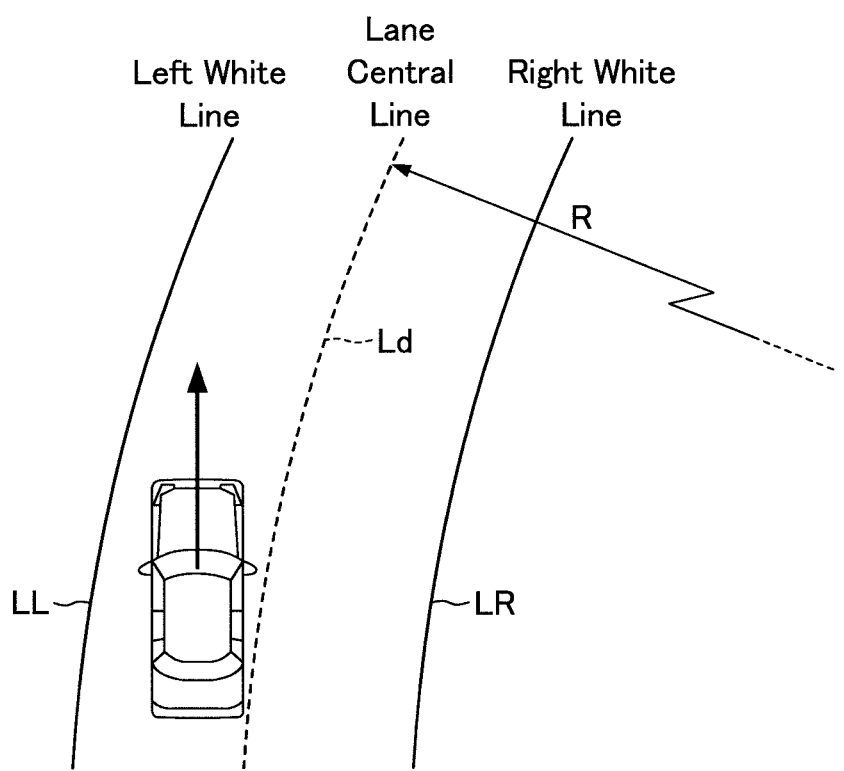
FIG. 2 is a plan view for showing right and left white lines LL and LR, a target traveling line Ld, and a curve radius R.

The camera 30 is connected to the lane recognition part 11. The camera 30 photographs the foreground of the self-vehicle and transmits image data which is photographed and obtained to the lane recognition part 11. The lane recognition part 11 analyzes the image data transmitted from the camera 30, and recognizes (detects) white lines on the right and left sides of a road. For example, as shown in FIG. 2, the lane recognition part 11 recognizes a left white line LL and a right white line LR, and sets a lane central line that is in a center position between these white lines LL and LR as a target traveling line Ld. Moreover, the lane recognition part 11 calculates a curve radius R of the target traveling line Ld. The target traveling line Ld does not necessarily have to be set at the center position between the right and left white lines, and may be set at a position shifted by a predetermined distance from the center position in a crosswise direction.

Figure 3:
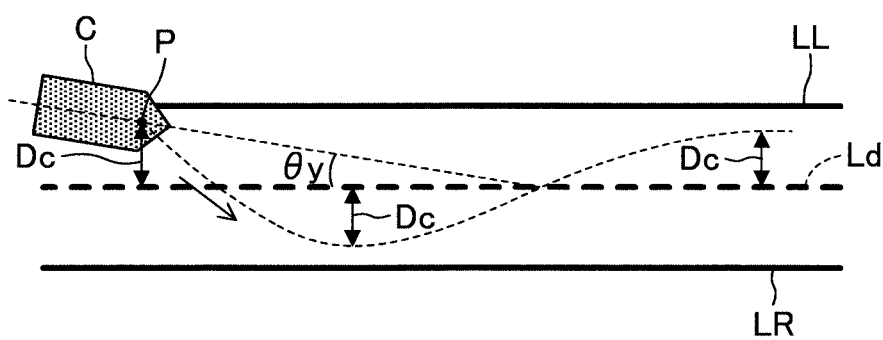
FIG. 3 is a plan view for showing a center distance Dc and a yaw angle θy, which is lane information in a case where lane keep assist control is carried out.

The lane recognition part 11 calculates a position and orientation of the self-vehicle in the traveling lane divided with the left white line LL and the right white line LR. For example, as shown in FIG. 3, the lane recognition part 11 calculates a distance Dc (referred to as a center distance Dc) in a road width direction between a reference point P of the self-vehicle C and the target traveling line Ld and a deviation angle θy (hereafter referred to as a yaw angle θy) between the direction of the target traveling line Ld and the direction, to which the self-vehicle is oriented. In the present embodiment, the reference point P is set at a center position between right and left front wheels on an axle of the right and left front wheels. This yaw angle θy expresses an "angle between the direction, to which the self-vehicle is oriented, and the traveling lane" in the present invention.

Figure 4:
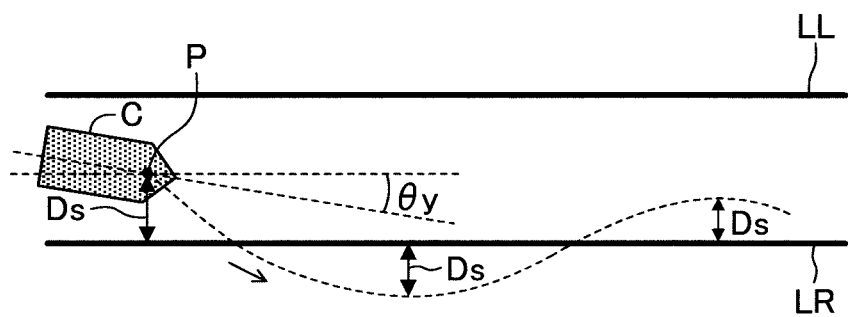
FIG. 4 is a plan view for showing a side distance Ds and a yaw angle θy, which is lane information in a case where lane departure suppression control is carried out.

Moreover, as shown in FIG. 4, the lane recognition part 11 calculates a distance Ds (referred to as a side distance Ds) in a road width direction between the reference point P of the self-vehicle C and the right white line LR, and calculates the side distance Ds in a road width direction between the reference point P of the self-vehicle C and the right white line LL, respectively. In FIG. 4, only the side distance Ds between the reference point P and the right white line LR is shown. The values (Dc, Ds, θy, R) calculated by the lane recognition part 11 are referred to as lane information.

The lane departure suppression control part 12 carries out the lane departure suppression control. The lane departure suppression control is referred to as LDA (Lane Departure Alert). The LDA is control to assist a steering operation while warning a driver by giving steering assist torque to the steering mechanism such that a self-vehicle does not deviate out of the traveling lane, when the self-vehicle is likely to deviate out of the traveling lane (outside the white line). Hereafter, the lane departure suppression control part 12 will be referred to as an LDA control part 12, and the lane departure suppression control will be referred to as LDA control.

On the other hand, the lane keep assist control part 13 carries out the lane keep assist control. The lane keep assist control is referred to as LKA (Lane Keep Assist). The LKA is control to assist a steering operation by a driver, by giving steering assist torque to the steering mechanism such that a traveling position of a self-vehicle is maintained near the target traveling line (for example, the center position of the traveling lane). Hereafter, the lane keep assist control part 13 will be referred to as an LKA control part 13, and the lane keep assist control will be referred to as LKA control.

In addition, the LKA control and the LDA control are configured so as not to be carried out when they are set as OFF by a selecting switch which is not shown. Moreover, the LKA control and the LDA control are carried out when the vehicle speed of the self-vehicle is a predetermined vehicle or more.

The LDA control part 12 is inputted vehicle-speed information (Ds, θy, R) calculated by the lane recognition part 11, and calculates target torque TLDA for keeping the self-vehicle from departing out of the traveling lane. Although the LDA control part 12 calculates the target torque TLDA in the present embodiment, a target rudder angle θLDA for keeping the self-vehicle from deviating out of the traveling lane may be calculated instead.

The LDA control part 12 calculates the target torque TLDA according to the following formula (1).

$$TLDA = K1 \times (V^2/R) + K2 \times Ds' + K3 \times \theta y + K4 \times (\gamma^* - \gamma) \quad (1)$$

Here, K1, K2, K3, and K4 are control gains, respectively. V expresses the vehicle speed of the self-vehicle. Moreover, γ* is a target yaw rate and γ is an actual yaw rate of the self-vehicle which is detected by a yaw rate sensor. Further, Ds' is set corresponding to the side distance Ds. When the reference point P of the self-vehicle C is located inside (road center side from) the white lines as the targets of departure avoidance (referred to as target white lines), the smaller value Ds' is set to, the deeper inside the white lines the reference point P is located (the larger Ds is), whereas the larger value Ds' is set to, the closer to the white lines the reference point P is located (the smaller Ds is). On the other hand, when the reference point P of the self-vehicle C is located outside the target white lines, the larger value Ds' is set to, the further outside the white lines the reference point P is located. For example, in a case where the side distance Ds is represented in a negative value when the reference point P is located outside the target white lines, what is necessary is just to set Ds' to a value obtained by subtracting the side distance Ds from a predetermined reference side distance Dsref (Ds'=Dsref−Ds).

The first term on the right-hand side of the formula (1) is a torque component which is determined depending on the curve radius R of the road and which works on a feed-forward basis. The second term on the right-hand side of the formula (1) is a torque component which works on a feedback basis such that the self-vehicle is suppressed from approaching the white line in the road width direction (such that location deviation in the road width direction becomes smaller). The third term on the right-hand side of the formula (1) is a torque component which works on a feedback basis such that the yaw angle θy becomes smaller (such that the deviation of the direction of the self-vehicle with respect to the target traveling line Ld becomes smaller). The target yaw rate γ* is determined as a value based on the sum of the first term, the second term, and the third term on the right-hand side. The fourth term on the right-hand side of the formula (1) is a torque component which works on a feedback basis such that the deviation between the target yaw rate γ* and the actual yaw rate γ becomes smaller. In addition, a value obtained by multiplying the control gain by the deviation between a target lateral acceleration Gy* and an actual lateral acceleration Gy detected by a lateral acceleration sensor can also be used as the fourth term on the right-hand side. Moreover, the fourth term on the right-hand side may be omitted.

The LDA control part 12 calculates the target torque TLDA in a predetermined operation period. Therefore, the larger the control gain K1, K2, K3 and K4 are, the larger the amount of alteration per unit time of the target torque TLDA can be made, and responsiveness can be improved. In addition, the control gain K1, K2, and K3 are set variably (changeably) to values according to the vehicle speed V, and the higher the vehicle speed V is, the larger values they are set to, for example.

The LDA control part 12 supplies the target torque TLDA which is a result of the calculation to the control switching part 14.

On the other hand, the LKA control part 13 is inputted the vehicle-speed information (Dc, θy, R) calculated by the lane recognition part 11, and calculates target torque TLKA for the self-vehicle to travel along the target traveling line Ld. In addition, although the LDA control part 13 calculates the target torque TLKA in the present embodiment, a target rudder angle θLKA for the self-vehicle to travel along the target traveling line Ld may be calculated instead.

The LKA control part 13 calculates the target torque TLKA by the following formula (2).

$$TLKA = K11 \times (V^2/R) + K12 \times Dc + K13 \times \theta y \quad (2)$$

Here, K11, K12 and K13 are control gains, respectively.

The first term on the right-hand side of the formula (2) is a torque component which is determined depending on the curve radius R of the road and which works on a feed-forward basis. The second term on the right-hand-side of a formula (2) is a torque component which works on a feedback basis such that the center distance Dc which is a gap of location (location deviation) in the road width direction of the self-vehicle with respect to the target traveling line Ld becomes smaller. The third term on the right-handside of the formula (2) is a torque component which works on a feedback basis such that the yaw angle θy becomes smaller (such that the deviation of the direction of the self-vehicle with respect to the target traveling line Ld becomes smaller). The control gains K11, K12 and K13 may be fixed values, or the higher the vehicle speed V is, the larger values they may be set to.

The LKA control is control for assisting an operation by a driver such that a self-vehicle travels along the target traveling line Ld, and it is required that a steering feeling is comfortable. For this reason, the steering assist torque is set such that steering is performed slowly. On the other hand, the LDA control is control in which the steering assist torque is given to the steering mechanism to assist a steering operation by a driver such that the self-vehicle does not deviate out of the traveling lane when the self-vehicle is likely to deviate out of the traveling lane (outside the white lines). Therefore, it is required that the steering assist torque occurs with sufficient responsiveness.

For this reason, the rate of change of the target torque (the amount of alteration of the target torque obtained per unit time) is set so as to be larger in the LDA control as compared with that in the LKA control. Namely, the control gain in the LDA control is set larger than the control gain in the LKA control. In this case, especially, as for the control gains K2 and K12 that are the feedback-control terms of the location deviation, K2 needs to be set larger than K12 (K2>K12), and as for the control gains K3 and K13 that are feedback-control terms of a direction deviation, K3 needs to be set larger than K13 (K3>K13).

Moreover, although lateral acceleration occurs on the self-vehicle when the LDA control or the LKA control is carried out, an upper limit of the lateral acceleration Gy is prepared in the present embodiment. Namely, maximum lateral acceleration GyLDAmax which is a largest value of the lateral acceleration Gy allowed to generate is set in the LDA control, and maximum lateral acceleration GyLKAmax which is a largest value of the lateral acceleration Gy allowed to generate is set in the LKA control. Therefore, the target torque TLDA and the target torque TLKA are calculated in consideration of the upper limits by the maximum lateral acceleration GyLDAmax and the maximum lateral acceleration GyLKAmax. Hereafter, an upper limit value of the target torque TLDA restricted with the maximum lateral acceleration GyLDAmax is referred to as an upper limit torque TLDAmax, and an upper limit value of the target torque TLKA restricted with the maximum lateral acceleration GyLKAmax is referred to as an upper limit torque TLKAmax. In the present embodiment, the upper limit torque TLDAmax is set to a larger value than the upper limit torque TLKAmax.

The LKA control part 13 supplies the target torque TLKA which is a result of the calculation to the control switching part 14.

The control switching part 14 is inputted the target torque TLDA, the target torque TLKA, and the lane information (Dc, Ds, θy, R) in a predetermined operation period. The LDA control and the LKA control are not carried out simultaneously. Therefore, the control switching part 14 has a function to switch the control (LDA control or LKA control) to be carried out based on the target torque TLDA, the target torque TLKA and the lane information. The control switching part 14 opts for the control (LDA control or LKA control) to be finally carried out based on the target-torque-TLDA, the target-torque-TLKA and the lane information, and transmits a steering instruction expressing a controlled variable (target torque) calculated by a control part (the LDA control part 12 or LKA control part 13) which carries out the opted control to the EPS-ECU20. In addition, in second control switching processing which will be mentioned later, the LKA control is divided into usual LKA control and stronger LKA control, and three types of control including these two types of the LKA control and the LDA control are switched selectively.

Next, as for control switching processing, two examples (first control switching processing and the second control switching processing) will be explained. Here, the control switching processing will be explained using whole processing which the driving assist ECU10 carries out, including processing in the LDA control part 12, the LKA control part 13 and the control switching part 14.

<First Control Switching Processing>

Figure 5:
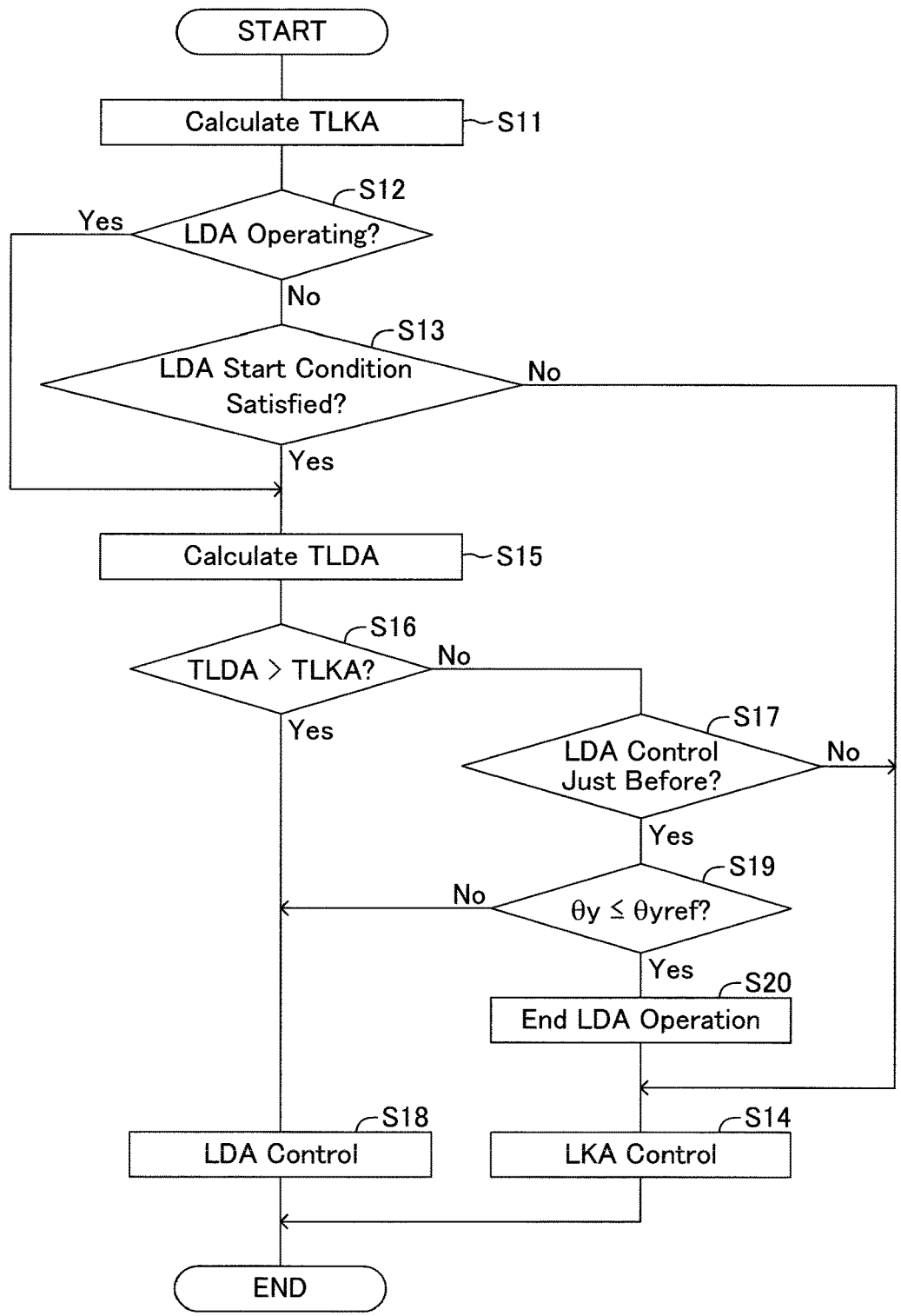
FIG. 5 is a flowchart for showing a first control switching routine.

First, the first control switching processing will be explained. FIG. 5 is a flowchart for showing the first control switching processing which the driving assist ECU10 carries out (which is referred to as the first control switching routine). The driving assist ECU10 repeatedly carries out the first control switching routine in a predetermined operation period, when the LKA control and the LDA control are selected to be carried out by a switch, which is not shown, and another permission condition (for example, a condition that vehicle speed is a predetermined velocity or more) is satisfied.

Once the first control switching routine is started, the driving assist ECU10 calculates the target torque TLKA for the LKA control in step S11. This processing is carried out by the LKA control part 13. Therefore, while the first control switching routine is being carried out, the target torque TLKA is always being calculated.

Subsequently, the driving assist ECU10 judges whether the LDA control part 12 is under operation or not in step S12. Here, the "under operation" means that the target torque TLDA is being calculating. In the LDA control part 12, a calculation start condition for the target torque TLDA has been set. In the present embodiment, the calculation start condition for the target torque TLDA is satisfied when the side distances Ds between the reference point P of the self-vehicle and the white line on right or left side becomes shorter than a predetermined fixed distance (reference side distance Dsref).

When the LDA control part 12 is not under operation (S12: No), the driving assist ECU10 judges whether an operation start condition for the LDA control part 12, that is, the calculation start condition for the target torque TLDA, is satisfied or not in step S13. The LDA control part 12 carries out these judgments in steps S12 and S13. When the self-vehicle is running at the center position of the road, the operation start condition for the LDA control part 12 is not satisfied (S13: No). Therefore, the LDA control part 12 does not supply the target torque TLDA to the control switching part 14. In this case, the driving assist ECU10 transmits a steering instruction expressing the target torque TLKA to the EPS-ECU20 in step S14. Namely, the control switching part 14 transmits a steering instruction expressing the target torque TLKA supplied from the LKA control part 13 to the EPS-ECU20. Thereby, the LKA control is carried out.

On the other hand, when the operation of the LDA control part 12 has been started (S12: Yes), or when the operation start condition for the LDA control part 12 is satisfied (S13: Yes), the driving assist ECU10 calculates the target torque TLDA in step S15. This processing in step S15 is carried out by the LDA control part 12.

Subsequently, the driving assist ECU10 judges whether the target torque TLDA is larger than the target torque TLKA or not in step S16. When the target torque TLDA is not larger than the target torque TLKA (S16: No), the driving assist ECU10 judges whether the LDA control was being carried out until immediately before or not, in step S17. When the LDA control was not being carried out (S17: No), the driving assist ECU10 progresses processing to step S14, and carries out the LKA control. These judgments in steps S16 and S17 are carried out by the control switching part 14.

Such processing is repeated, and when the self-vehicle approaches the white line and the target torque TLDA becomes larger than the target torque TLKA (S16: Yes), the driving assist ECU10 transmits a steering instruction expressing the target torque TLDA to the EPS-ECU20 in step S18. When the target torque TLDA becomes larger than the target torque TLKA, it is presumed that there is a possibility that the self-vehicle may deviate out of the traveling lane by the LKA control. Therefore, in this case, the control switching part 14 transmits a steering instruction expressing the target torque TLDA supplied from the LDA control part 12 to the EPS-ECU20. Thereby, the LDA control is carried out. In this case, the control switching part 14 supplies an LDA underway signal expressing that the LDA control is being carried out (underway) to the LDA control part 12. The LDA control part 12 operates the annunciator 50 based on this LDA underway signal to alert a driver.

Such processing is repeated, and when the target torque TLDA becomes the target torque TLKA or less (S16: No), the driving assist ECU10 progresses processing to step S17. For example, when a lane departure avoidance operation of the self-vehicle is completed (when the self-vehicle is turned toward the inside of a lane), the target torque TLDA gradually decrease to be the target torque TLKA or less. In this case, since the LDA control was being carried out until immediately before, it is judged as "Yes" in step S17. When the LDA control was being carried out until immediately before, the driving assist ECU10 judges whether the yaw angle θy is the switching judgment threshold θyref or less in step S19. In the present embodiment, this switching judgment threshold θyref is set as an angle at which the orientation of the self-vehicle can be considered to be almost parallel (substantially parallel) to the traveling lane. The judgment in step S19 is carried out by the control switching part 14. In addition, the yaw angle θy judged in step S19 is a magnitude, regardless of its direction.

The driving assist ECU10 progresses processing to step S18, when the yaw angle θy is larger than the switching judgment threshold θyref, namely when the orientation of the self-vehicle is not almost parallel to the traveling lane. Accordingly, the LDA control is continued.

For this reason, the processing in step S16 to step S19 is repeated and the LDA control is continued until the orientation of the self-vehicle becomes almost parallel to the traveling lane, even when the target torque TLDA becomes the target torque TLKA or less. When the yaw angle θy becomes the switching judgment threshold θyref or less, the driving assist ECU10 ends the calculation of the LDA control in step S20. Namely, the calculation of the target torque TLDA by the LDA control part 12 is ended. This processing is carried out by supplying an operation end instruction to the LDA control part 12 from the control switching part 14.

The driving assist ECU10 progresses processing to step S14, after ending the operation of the LDA control. Thereby, assist control which the driving assist ECU10 carries out is switched from the LDA control to the LKA control.

In accordance with this first control switching routine, the LKA control is preferentially carried out, and the LKA control is switched to the LDA control when there is a possibility that the self-vehicle may deviate from a lane under the LKA control (S16: Yes). Then, when the lane departure avoidance operation of the self-vehicle is finished, the assist control is return to the LKA control from the LDA control. A condition for thus returning the assist control to the LKA control from the LDA control is that the orientation of the self-vehicle is almost parallel to the traveling lane. The reason for this will be explained hereafter.

As mentioned above, the LKA control is for assisting an operation by a driver such that a self-vehicle travels along the target traveling line Ld, and it is required that a steering feeling is comfortable (a steering handle does not rotate suddenly). For this reason, the control gain in the LKA control is set to be smaller, and therefore the orientation and lateral location of the vehicle cannot be changed with sufficient responsiveness. For this reason, since steering assist torque cannot be increased quickly, the self-vehicle cannot follow the target traveling line in a sharp curve etc. Accordingly, the self-vehicle deviates out of the traveling lane, only under the LKA control.

On the other hand, the LDA control is control in which steering assist torque is given to the steering mechanism and assists a steering operation by a driver such that the self-vehicle may not deviate out of a lane. For this reason, in the LDA control, the control gain is set to be larger than that in the LKA control, and steering assist torque can be generated with sufficient responsiveness. Therefore, when there is a possibility that the self-vehicle may deviate out of the traveling lane under the LKA control, the LDA control is carried out in place of the LKA control.

When there is no possibility that the self-vehicle may deviate from the traveling lane, the driving assist ECU10 carries out the LKA control preferentially. Therefore, after the self-vehicle is avoided from lane departure, assist control is returned to the LKA control from the LDA control. When the LDA control is carried out, the orientation of the self-vehicle may become greatly slanting to the traveling lane (face inside the traveling lane). When the LDA control is switched to the LKA control at a stage where the self-vehicle is slanting to the traveling lane, the LKA control cannot quickly correct the orientation of the self-vehicle to the direction of the traveling lane. For this reason, the self-vehicle travels toward a road end on the opposite side (the white line on the opposite side of the other white line where the departure was avoided) as it is, and there is a possibility of deviating from the road end on the opposite side even if the assist control is switched to the LDA control in the middle, when the approach angle is large.

From the above, in the present embodiment, the LDA control is switched to the LKA control after the orientation of the self-vehicle becomes almost parallel to the traveling lane. Thereby, the above-mentioned subject can be solved.

Figure 6:
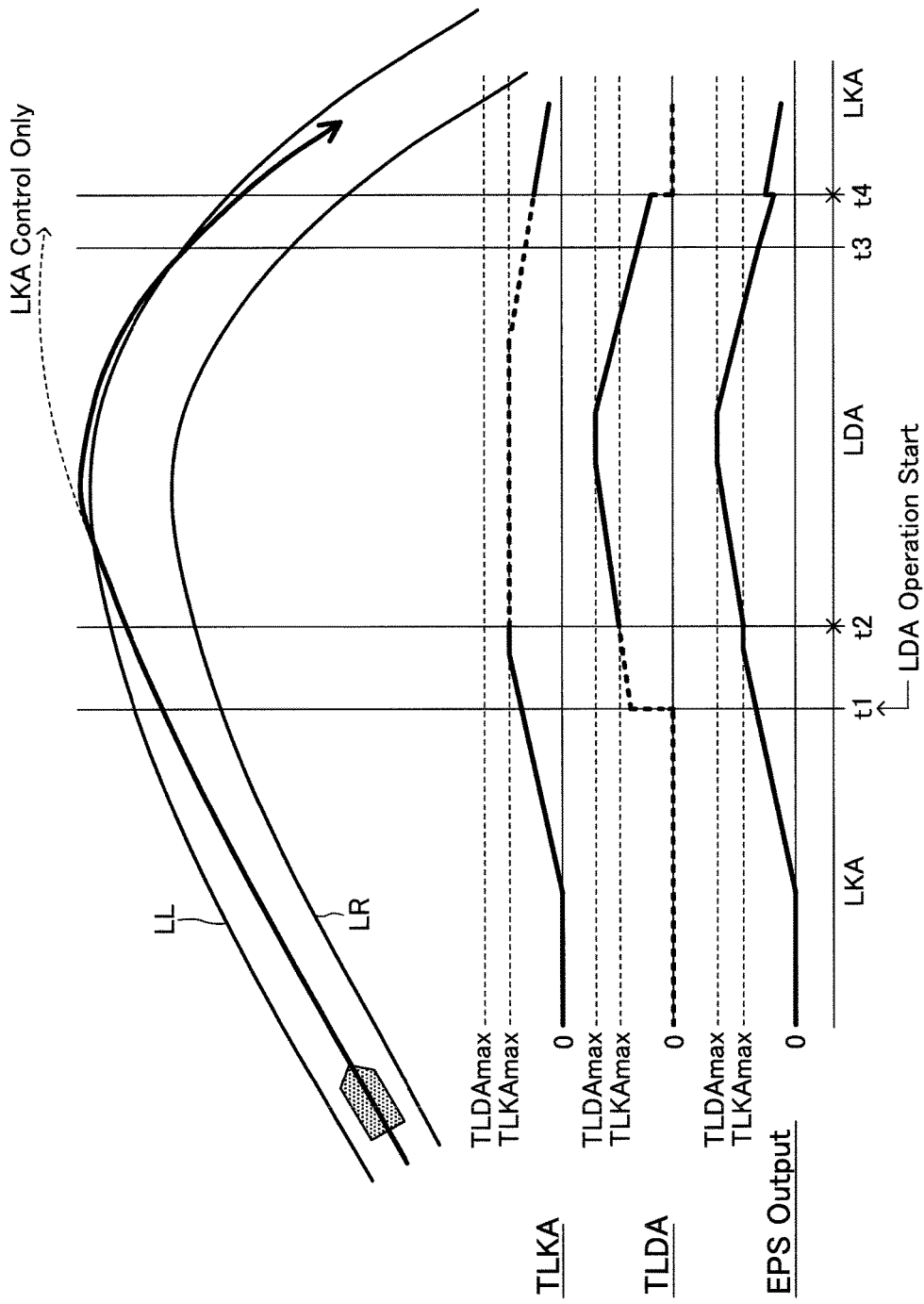
FIG. 6 is a graph for showing a relation between a traveling position of a self-vehicle and transition of target torque.

FIG. 6 is a graph for showing a relation between the traveling position of the self-vehicle and transition of the target torque when the first control switching routine is carried out. Among the torque waveforms in FIG. 6, the target torque TLKA is shown in the upper row, the target torque TLDA is shown the middle row, and the target torque instructed to the EPS-ECU20 is shown in the lower row. When the self-vehicle comes to a curve during the LKA control is being carried out, the operation of the LDA control is started, namely, the calculation of the target torque TLDA is started (time t1). At this time point, since the target torque TLDA is the target torque TLKA or less, the LKA control is continued as it is. Then, at time t2 when the self-vehicle approached the white line, when the target torque TLDA exceeds the target torque TLKA, the LDA control is carried out in place of the LKA control.

After the lane departure avoidance operation of the self-vehicle is completed, the controlled variable for the LDA control decreases. Then, at time t3, the target torque TLDA becomes less than the target torque TLKA. Even in this case, the LDA control is continued until the orientation of the self-vehicle becomes almost parallel to the traveling lane. Then, at time t4 when the orientation of the self-vehicle becomes almost parallel to the traveling lane, the LDA control is switched to the LKA control. In this way, the LKA control is stably started.

Next, the parallel control will be explained. In the present embodiment, control for making the orientation of the self-vehicle parallel to the traveling lane is included in the LDA control. This control is referred to as parallel control. Regarding the parallel control, two techniques (first parallel control and second parallel control) will be explained below. This parallel control can also be expressed as "control in which a function to turn the self-vehicle in a direction parallel to the traveling lane is enhanced in the LDA control."

<First Parallel Control>

Figure 7:
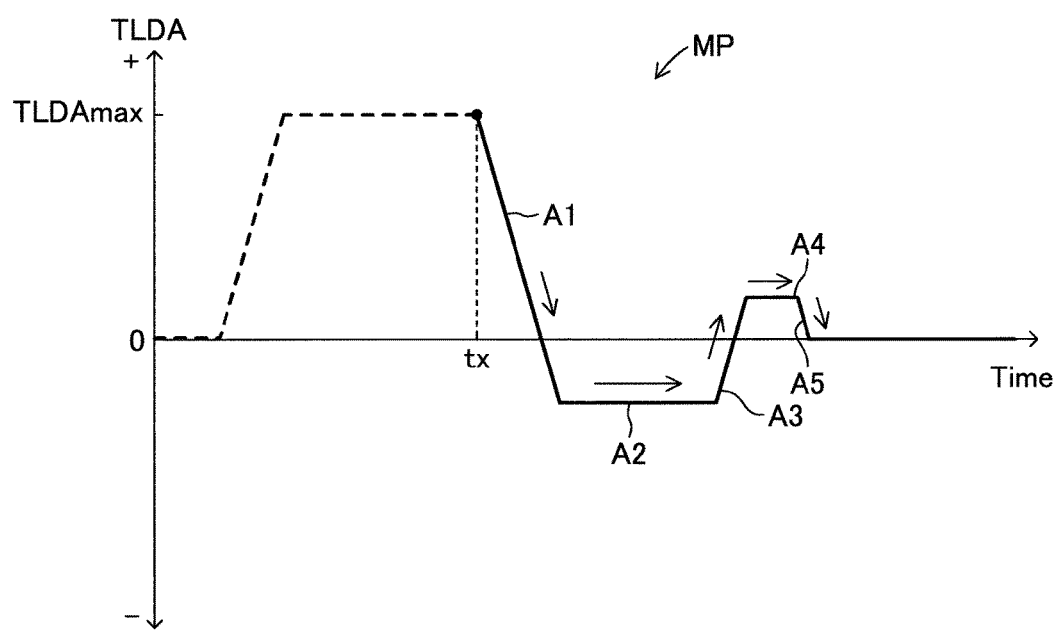
FIG. 7 is a graph for showing the torque map for a parallel control.

First, the first parallelism control will be explained. The LDA control part 12 has memorized a torque map MP as shown in FIG. 7, and calculates the target torque TLDA on a feed forward according to time progress based on this torque map MP, in place of the above-mentioned formula (1), at a timing (time tx) when the target torque TLDA calculated by the formula (1) is switched to decrease.

This torque map MP is constituted by a first property A1 which decreases the target torque TLDA to a predetermined negative value, a second property A2 which maintains the target torque TLDA at the predetermined negative value, a third property A3 which increases the target torque TLDA to a predetermined positive value, a fourth property A4 which maintains the target torque TLDA at the predetermined positive value, and a fifth property A5 which decreases the target torque TLDA to zero, a value of the target torque TLDA with respect to the time progress is set in each properties. In addition, regarding the sign of the target torque TLDA, a direction of the torque generated for the first time such that the self-vehicle does not deviate from the lane is defined as a positive direction.

On this torque map MP, a ratio of an integrated value of the positive target torque TLDA (area included in a positive region) and an integrated value of the negative target torque TLDA (area included in a negative region) after the time tx is set so as to be a predetermined ratio (for example, 1:1). Moreover, the LDA control part 12 has memorized a plurality of patterns of the torque map MP, and chooses the torque map MP nearest to transition of the target torque TLDA in a period after the calculation of the target torque TLDA is started until the target torque TLDA is switched to decrease. The LDA control part 12 sets the target torque TLDA to a value specified on the torque map MP according to time progress, referring to the selected torque map MP. On the torque map MP, respective properties (the first properties A1 to the fifth properties A5) are determined, based on a result of an experiment, such that the orientation of the self-vehicle becomes almost parallel to the traveling lane. In addition, each torque map MP also includes transition information of the target torque TLDA after the calculation of the target torque TLDA is started until the target torque TLDA is switched to decrease, as information for choosing the torque map MP.

Thus, the orientation of the self-vehicle can be made almost parallel to the traveling lane at an early stage, by incorporating the parallel control into the LDA control.

<Second Parallel Control>

Figure 8:
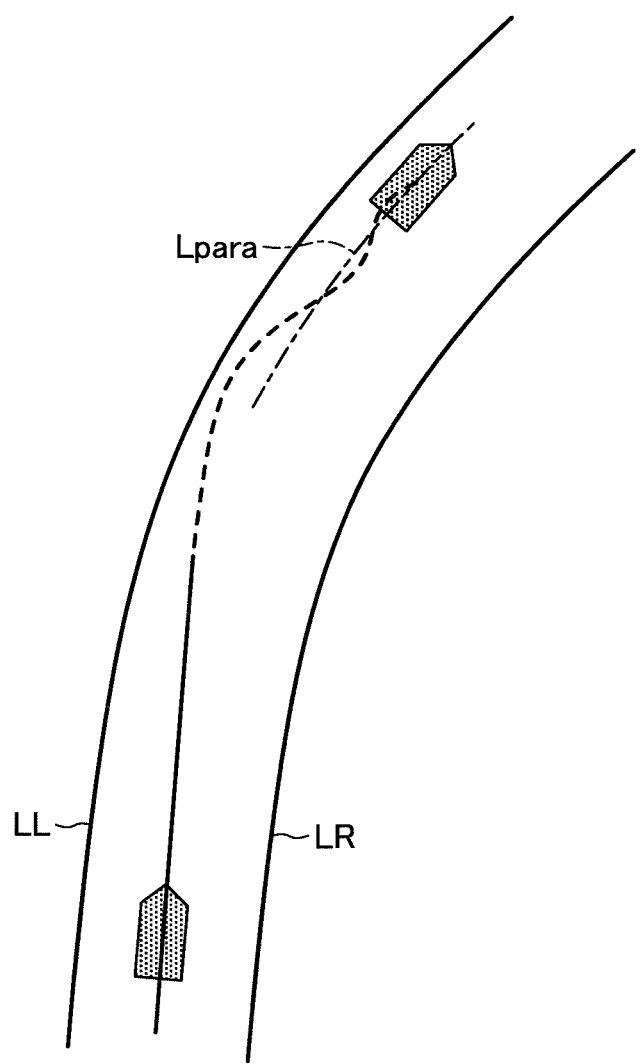
FIG. 8 is a plan view for showing a target traveling line Lpara for parallel control.

Next, the second parallel control will be explained. From an arbitrary time point after the target torque TLDA is switched to decrease (referred to as "time tpara"), the LDA control part 12 sets a target traveling line Lpara for parallel control so as to be parallel to the white line, inside the white lines as the targets of departure avoidance, as shown in FIG. 8. The target traveling line Lpara for parallel control is set inside by a predetermined distance from the white line as a target of departure avoidance, for example. Then, the LDA control part calculates the target torque for making the self-vehicle travel along this target traveling line Lpara for parallel control. Therefore, the LDA control part calculates the target torque TLDA by the formula (1) until the time tpara, and calculates the target torque TLDA for making the self-vehicle travel along the target traveling line Lpara for parallel control, in place of the formula (1), after the time tpara.

For example, the target torque TLDA for making the self-vehicle travel along the target traveling line Lpara for parallel control is calculated by using a formula in which Dc is defined as a location deviation between the target traveling line Lpara for parallel control and the reference point P of the self-vehicle and respective control gains K11, K12 and K13 are set to larger values than values used in the LKA control, in place of the formula (2) which is an operational expression for the LKA control. Thereby, steering assist torque can be generated with sufficient responsiveness especially to the deviation (Dc, θy), and the orientation of the self-vehicle can be quickly made almost parallel to the traveling lane.

In the above-mentioned first control switching routine, the driving assist control is switched from the LDA control to the LKA control, after the orientation of the self-vehicle becomes almost parallel to the traveling lane by this parallel control (the first parallel control or the second parallel control).

<Second Control Switching Processing>

Figure 9:
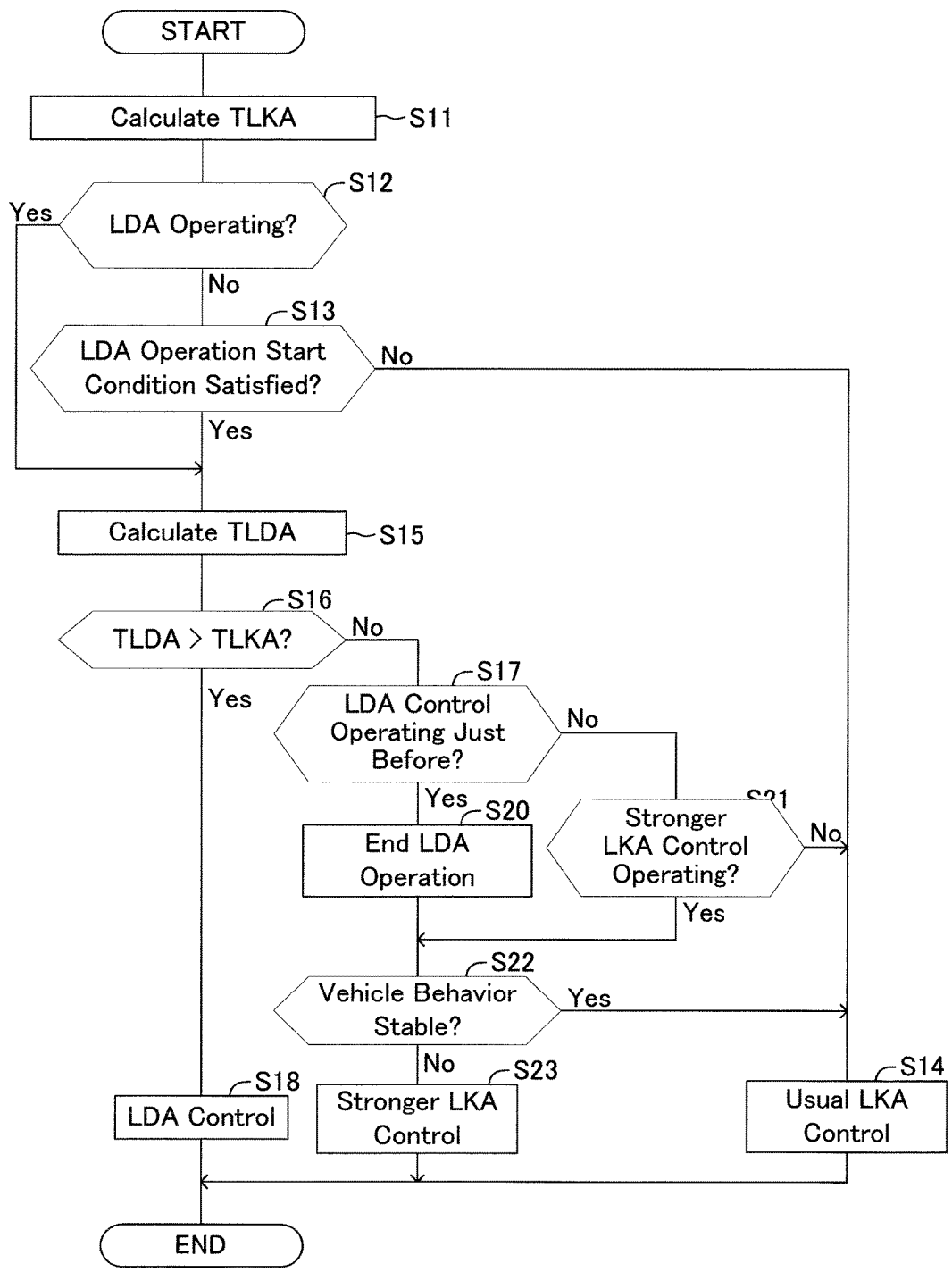
FIG. 9 is a flowchart for showing a second control switching routine.
Figure 10:
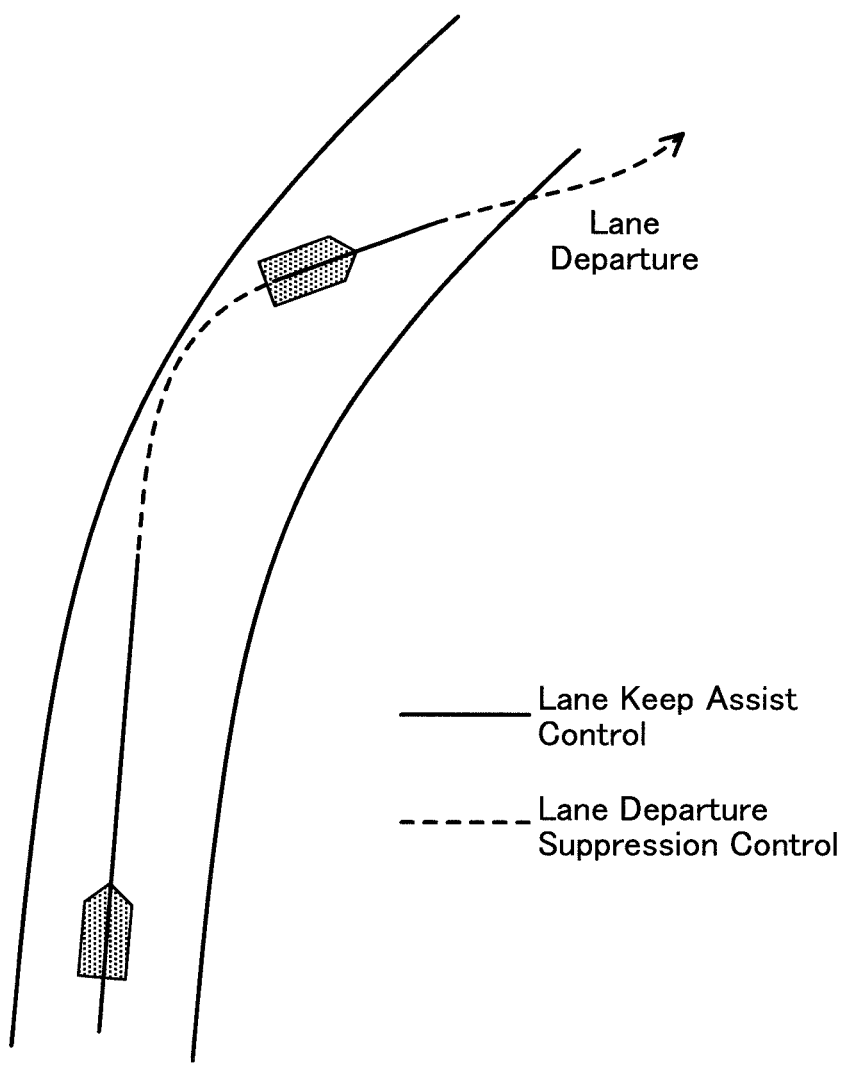
FIG. 10 is a plan view for showing a locus which a vehicle deviating from a traveling lane follows.

Next, a second control switching processing will be explained. FIG. 9 is a flowchart for showing the second control switching processing (referred to as a second control switching routine) which the driving assist ECU10 carries out. The driving assist ECU10 repeatedly carries out the second control switching routine in a predetermined operation period, when the LKA control and the LDA control are selected to be carried out by a switch, which is not shown, and another permission condition (for example, a condition that vehicle speed is a predetermined velocity or more) is satisfied. In addition, the same step number as the first control switching routine is attached to the same processing as the first control switching routine, and the process will be explained only briefly.

When the second control switching routine is started, the driving assist ECU10 calculates the target torque TLKA for the LKA control in step S11. Then, the driving assist ECU10 judges whether the LDA control part 12 is under operation (under calculation of the target torque TLDA) or not in step S12. When the LDA control part 12 is not under operation (S12: No), the driving assist ECU10 judges whether the operation start condition of the LDA control part 12, that is, the calculation start condition of the target torque TLDA, is satisfied or not, in step S13.

When the self-vehicle is traveling the center position of the road, the operation start condition of the LDA control part 12 is not satisfied (S13: No). In this case, the driving assist ECU10 transmits a steering instruction expressing the target torque TLKA to the EPS-ECU20 in step S14. Namely, the control switching part 14 transmits a steering instruction expressing the target torque TLKA supplied from the LKA control part 13 to the EPS-ECU20. Thereby, the LKA control is carried out.

In the second control switching routine, there are two kinds of the LKA control, and one of them is usually LKA control and another is stronger LKA control. The usually LKA control is the above-mentioned LKA control. The LKA control carried out in step S14 corresponds to the usually LKA control. Although it will be mentioned later, the stronger LKA control is LKA control in which the control gain K12 and K13 are set to larger values and convergence performance that is performance to make the self-vehicle converge to the target traveling line Ld is improved, as compared with the usual LKA control.

On the other hand, when the operation of the LDA control part 12 is started (S12: Yes), or when the operation start condition of the LDA control part 12 is satisfied (S13: Yes), the driving assist ECU10 calculates the target torque TLDA in step S15. Then, the driving assist ECU10 judges whether the target torque TLDA is larger than the target torque TLKA or not in step S16. When the target torque TLDA is not larger than the target torque TLKA (S16: No), the driving assist ECU10 judges whether the LDA control was being carried out until immediately before or not in step S17.

When the LDA control was not being carried out immediately before (S17: No), the driving assist ECU10 progresses processing to step S21, and judges whether the stronger LKA control is being carried out or not. In this case, since the stronger LKA control is not being carried out, the driving assist ECU10 progresses processing to step S14, and carries out the usually LKA control. This judgment in step S21 is carried out by the control switching part 14.

Such processing is repeated, and when the target torque TLDA becomes larger than the target torque TLKA (S16: Yes), the driving assist ECU10 transmits a steering instruction expressing the target torque TLDA to the EPS-ECU20 in step S18. Namely, the control switching part 14 transmits a steering instruction expressing the target torque TLDA supplied from the LDA control part 12 to the EPS-ECU20. Thereby, the LDA control is carried out.

When the lane departure avoidance operation of the self-vehicle is completed and the target torque TLDA becomes the target torque TLKA or less (S16: No), the driving assist ECU10 progresses processing to step S17. In this case, since the LDA control was being carried out immediately before, it is judged as "Yes" in step S17. When the LDA control was being carried out immediately before, the driving assist ECU10 ends the operation of the LDA control in step S20. Namely, the calculation of the target torque TLDA by the LDA control part 12 is ended. This processing is carried out by supplying an operation end instruction to the LDA control part 12 from the control switching part 14.

Subsequently, the driving assist ECU10 judges whether the behavior of the self-vehicle has been stabilized or not in step S22. In this case, the driving assist ECU10 judges whether the center distance Dc which expresses a location deviation in the road width direction of the self-vehicle with respect to the target traveling line Ld is a switching judgment threshold Dcref or less and the yaw angle $\theta y$ which expresses a direction deviation of the self-vehicle with respect to the target traveling line Ld is a switching judgment threshold $\theta yref$ or less. The center distance Dc and the yaw angle $\theta y$ judged in step S22 are magnitudes, regardless of their directions.

These switching judgment thresholds Dcref and $\theta yref$ are values, based on which the self-vehicle can be regarded as being traveling stably on the target traveling line Ld. For example, the switching judgment threshold Dcref is set to a value, based on which the position in the road width direction of the self-vehicle can be regarded as substantially existing on the target traveling line Ld, and the switching judgment threshold $\theta yref$ is set to a value, based on which the orientation of the self-vehicle can be regarded as substantially parallel to the target traveling line Ld. This judgment in step S22 is carried out by the control switching part 14.

When it is judged that the behavior of the vehicle is not stable (S22: No), the driving assist ECU10 progresses processing to step S23, and carries out the stronger LKA control. In this case, the control switching part 14 transmits an instruction for making the LKA control part 13 carry out the stronger LKA control to the LKA control part 13. Thereby, the LKA control part 13 carries out the stronger LKA control. The LKA control part 13 calculates target torque TLKA' for the stronger LKA control by the following formula (3), and supplies the target torque TLKA' as a result of this calculation to the control switching part 14.

$$TLKA'=K11\times(V'/R)+K12'\times Dc+K13'\times\theta y \quad (3)$$

In this case, the control gain K12' is a value larger than the control gain K12 in the operational expression (formula) (2) in the usual LKA control, and the control gain K13' is a value larger than the control gain K13 in the operational expression (2) in the usually LKA control.

The control switching part 14 transmits a steering instruction expressing the target torque TLKA' calculated by the LKA control part 13 to the EPS-ECU20. Thereby, the stronger LKA control is carried out.

It becomes more important to make the self-vehicle stably travel along the target traveling line Ld rather than to make the steering feeling good, immediately after the lane departure avoidance operation of the self-vehicle is completed. Therefore, in the stronger LKA control, the steering assist torque which works on a feedback basis such that the location deviation in the road width direction of the self-vehicle with respect to the target traveling line Ld (center distance Dc) becomes smaller and the steering assist torque which works on a feedback basis such that the direction deviation of the self-vehicle with respect to the target traveling line Ld (yaw angle $\theta y$) becomes smaller are generated with sufficient responsiveness (quickly). Thereby, the self-vehicle can stably travel along the target traveling line Ld.

Although the present routine is repeatedly carried out in a predetermined operation period, after the stronger LKA control is started, it is judged as "No" in step S17 and it is judged as "Yes" in step S21. For this reason, until the behavior of the self-vehicle is becomes stable, that is, while it is being judged as "No" in step S22, the stronger LKA control (S23) is continued.

Such processing is repeated, and when the behavior of the self-vehicle becomes stable (S22: Yes), the driving assist ECU progresses processing to step S14, and switches the assist control from the stronger LKA control to the usually LKA control. In this case, the control switching part 14 transmits an instruction for carrying out the usually LKA control to the LKA control part 13. Thereby, the assist control which the LKA control part 13 carries out is switched from the stronger LKA control to the usually LKA control.

In accordance with this second control switching routine, the LKA control (usually LKA control) is preferentially carried out, and it is switched to from the LKA control to the LDA control when there is a possibility that the self-vehicle may deviate from a lane under the LKA control. Then, when the lane departure avoidance operation of the self-vehicle is completed, the assist control is switched from the LDA control to the stronger LKA control. The behavior of the self-vehicle is stabilized by this stronger LKA control, and thereafter the stronger LKA control is switched to the usually LKA control.

Thereby, the self-vehicle can be prevented from deviating out of a road end on the opposite side (the white line on the opposite side of the other white line where the departure was avoided) in association with switching to the LKA control from the LDA control.

In addition, also in this second control switching routine, the above-mentioned parallel control may be incorporated into the LDA control.

Although the in-lane driving assist apparatus for a vehicle according to the present embodiment has been explained as mentioned above, the present invention is not limited to the above-mentioned embodiment, and various modifications are possible unless it deviates from the objective of the present invention.

For example, operational expressions of target torque are not limited to the above-mentioned formulae (1), (2) and (3), and can be arbitrarily set.

REFERENCE SIGNS LIST

1: In-lane driving assist apparatus, 10: Driving assist ECU, 11: Lane recognition part, 12: Lane departure suppression control part (LDA control part), 13: Lane keep assist control part (LKA control part), 14: Control switching part, 20: Electric power-steering ECU (EPS-ECU), 21: Assist motor, 30: Camera, 40: Vehicle state sensor, 50: Annunciator, Dc: Center distance, Ds: Side distance, θy: Yaw angle, R: Curve radius, Ld: Target running line, K1, K2, K3 K4, K11, K12, K13: Control gain, TLDA, TLKA: Target torque, MP: Torque map, LL: Left white line, LR: Right white line.

The invention claimed is:

1. An in-lane driving assist apparatus for a vehicle, the in-lane driving assist apparatus comprising a processor configured to:
perform a lane keep assist control including controlling a steering assist torque of a steering mechanism in order to maintain a traveling position of a vehicle near a target traveling line;
perform a lane departure suppression control including controlling the steering assist torque of the steering mechanism in order to avoid the vehicle departing out of a traveling lane, the steering assist torque including a torque component that orients the vehicle in a direction parallel to the traveling lane;
when an angle between a vehicle direction and the direction parallel to the traveling lane is above a predetermined angle value during the lane keep assist control, perform the lane departure suppression control instead of performing the lane keep assist control; and
when the angle between the vehicle direction and the direction parallel to the traveling lane is the predetermined angle value or less, perform the lane keep assist control instead of performing the lane departure suppression control.

2. The in-lane driving assist apparatus for a vehicle, according to claim 1, wherein the lane departure suppression control includes a parallel control that is control carried outperformed after the above steering assist torque is controlled to decrease, the parallel control more aggressively orienting the self-vehicle to the direction parallel to the traveling lane than with a previous lane departure suppression control.

3. An in-lane driving assist apparatus for a vehicle, the in-lane driving assist apparatus comprising a processor configured to:
perform a lane keep assist control including controlling a steering assist torque of a steering mechanism in order to maintain a traveling position of a vehicle near a target traveling line;
perform a lane departure suppression control including controlling the steering assist torque of the steering mechanism in order to avoid the vehicle departing out of a traveling lane, the steering assist torque including a torque component that orients the vehicle in a direction parallel to the traveling lane;
when an angle between a vehicle direction and the direction parallel to the traveling lane is above a predetermined angle value during the lane keep assist control, perform the lane departure suppression control instead of performing the lane keep assist control; and
when the lane departure suppression control is switched to the lane keep assist control, perform a strong lane keep assist control including increasing a control gain from a first value to a second value to determine the steering assist torque in the lane keep assist control and then returning the control gain to the first value.

4. The in-lane driving assist apparatus according to claim 3, wherein the processor is further configured to, when a departure amount in a road width direction of the vehicle from the target traveling line is a predetermined value or less and the angle between the vehicle direction and the direction parallel to the traveling lane is the predetermined angle, perform the lane keep assist control including returning the control gain to the first value instead of performing the strong lane keep assist control.

* * * * *